(No Model.)

W. E. GAGE.
JOINT FOR ARTICLES OF WOOD.

No. 525,387. Patented Sept. 4, 1894.

Witnesses.
A. C. Harmon
Thomas J. Drummond

Inventor:
William E. Gage
by Crosby & Gregory
Attys

UNITED STATES PATENT OFFICE.

WILLIAM E. GAGE, OF AUGUSTA, MAINE.

JOINT FOR ARTICLES OF WOOD.

SPECIFICATION forming part of Letters Patent No. 525,387, dated September 4, 1894.

Application filed March 15, 1894. Serial No. 503,708. (No model.)

*To all whom it may concern:*

Be it known that I, WILLIAM E. GAGE, of Augusta, county of Kennebec, State of Maine, have invented an Improvement in Joints for Articles of Wood, of which the following description, in connection with the accompanying drawings, is a specification, like letters on the drawings representing like parts.

This invention relates to joints of the mortise and tenon type, used extensively in the framing of doors, windows, blinds, and in articles of furniture, the object of the invention being to improve such joints, whereby the tenon may be locked securely within the mortise, without causing the tenon to pass completely through the member in which the mortise is formed, *i. e.*, in what is known as a blind tenon joint.

Prior to my invention, so far as I am aware, the only method of locking the tenons within the mortises when the tenons do not extend completely through the member having the mortise, has been to pass a locking device or pin edgewise through the tenon into the material of the member in which the mortise is formed. Such a method of securing the tenon, is, however, open to the serious objection that the passage of the locking device or pin through the tenon weakens the latter, so as to render this method of fastening impracticable for general use.

My invention consists in inserting a locking device in the side joint or meeting plane between the side of the tenon and the wall of the mortise, said locking device being embedded part in the tenon and part in the mortise wall, whereby the said tenon is securely locked against endwise movement, yet without removing any considerable part of the tenon. In order to avoid weakening the tenon as far as possible, the locking device is preferably inserted diagonally, as will be hereinafter described.

Figure 1:
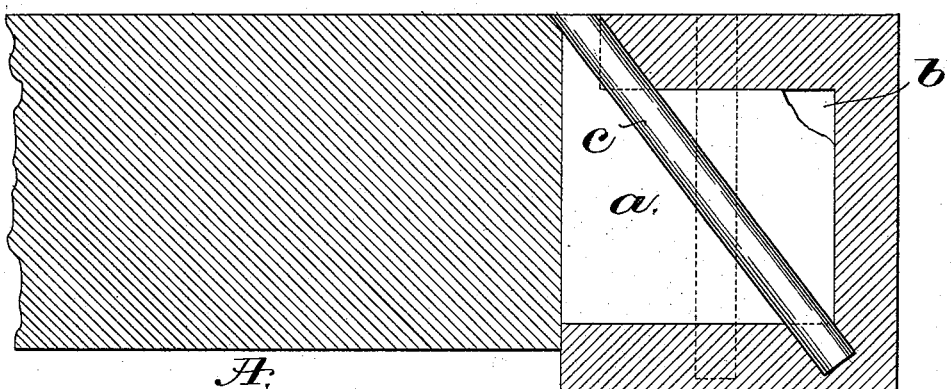
Figure 2:
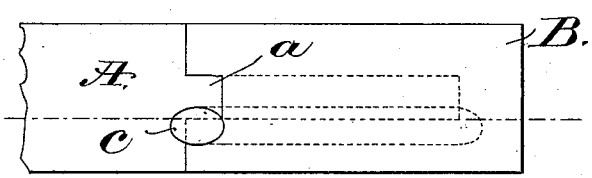

In the drawings, Figure 1 represents in vertical section a joint embodying my invention; Fig. 2 a top or plan view of the joint shown in Fig. 1; and Figs. 3 and 4 show the two halves of the section Fig. 2, laid open, showing the grooves in the tenon and mortise wall.

In this description I shall refer to my invention in connection with a joint such as used in connecting the members of a door, it being understood, however, that the said invention is applicable to joints in any other article.

Referring to the drawings, A represents one of the rails, and B one of the stiles of a usual door, said rail being provided, as usual, with a tenon *a* which enters a mortise *b* in the stile B, the mortise *b*, however, extending but partially through the stile, leaving the outer edge of said stile smooth and unbroken, so as to make what is known as a blind tenon joint. The tenon has the usual relish at its upper edge, best shown in Figs. 1, 3 and 4.

Figure 3:
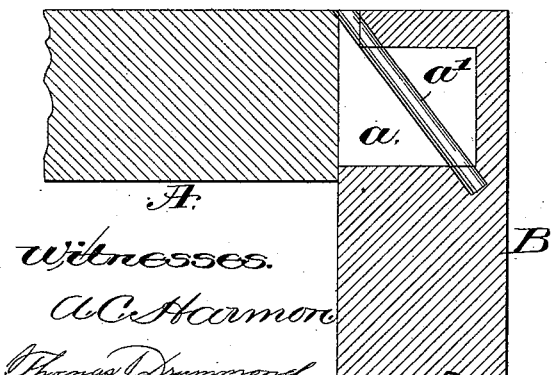
Figure 4:
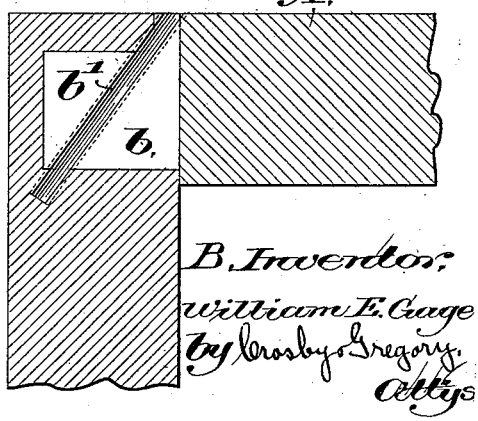

In accordance with this my present invention, preferably after the tenon has been inserted in the mortise, I bore a hole, preferably diagonally, as shown in full lines Fig. 1, starting from the outer edge of the door at a point where the rail and stile meet, down into the stile and tenon, following the plane of the joint between the side of the tenon and the mortise wall, as shown in Fig. 2, such hole, when bored, lying partially in the tenon, as shown at *a'* Fig. 3, and partially in the mortise wall, as shown at *b'* Fig. 4. A locking device or pin *c* is then driven tightly down into said hole, the locking device thereby being embedded partially in the tenon and partially in the mortise wall, see Fig. 2, and locking the tenon firmly and securely in the mortise. In practice I prefer that the greater portion of the hole be formed in the mortise wall in order to weaken the tenon as little as possible, for a locking device embedded one-sixteenth of an inch in the tenon locks the same as securely as though it were embedded one-eighth of an inch or more, and so long as the mortise walls hold, the tenon cannot be withdrawn.

I prefer to insert the locking device diagonally, as shown in full lines in the drawings, so as to weaken the tenon as little as possible, but if desired, said locking device may be driven straight in from the edge, as shown by dotted lines Fig. 1.

By comparing the dotted and full line position Fig. 1, it will be seen that in the dotted position Fig. 1, there is a straight line of weakness caused by removing a portion of the material of the tenon extending across the latter from side to side, which weakens the tenon more than removing the same amount of material diagonally, as in full lines, for in the latter case the material removed is, in successive vertical planes, at a different position as regards the length of the tenon, so that while at the top the tenon is weakened close to the shoulder, at the bottom the weakness is at the extreme end of the tenon.

It will be evident from Fig. 1 that this form of joint is particularly adapted for work wherein it is desired that the tenon shall not penetrate completely through the member having the mortise, the tenon being locked within the mortise as firmly as in any way now known to me for locking a tenon in a mortise with the tenon extending completely through the member containing the mortise. Of course the tenon may be glued in position as usual, and if desired the shape of the pin or locking device c may be varied, all without departing from the spirit and scope of this invention which may be otherwise varied and still come within the invention.

I claim—

1. The herein described joint, consisting of a member containing near its end a mortise, a tenon entering the same, and surrounded at its sides by the walls of said mortise and a locking device for the tenon driven in from the end of said member, in the plane of the joint between said tenon and mortise wall and embedded partly in said tenon and partly in the mortise wall said locking device at its end being thereby embedded wholly in and held by said mortise wall, and at other points embedded part in said wall and part in said tenon, thereby retaining the latter in the mortise without exposing said locking device at the end of said tenon, substantially as and for the purpose specified.

2. The herein described joint, consisting of a member containing a mortise and a tenon, and a locking device for the latter inserted diagonally between the side of the tenon and the mortise wall and embedded partly in each, substantially as and for the purpose specified.

3. The herein described blind joint, the same consisting of a member provided near its end with a mortise extending but partly through it, a co-operating member having a tenon entering said mortise, and surrounded by the walls of said mortise and a locking device driven in from the end of said member in the plane of the joint between said tenon and mortise wall, and embedded partly therein and partly in the mortise wall, said locking device at its ends being embedded wholly in the walls of said mortise, and thereby concealed from view at all sides of the joint except that edge of the latter where it is driven in substantially as described.

In testimony whereof I have signed my name to this specification in the presence of two subscribing witnesses.

WM. E. GAGE.

Witnesses:
A. M. GODDARD,
C. S. DOWNING.